Figure 1:
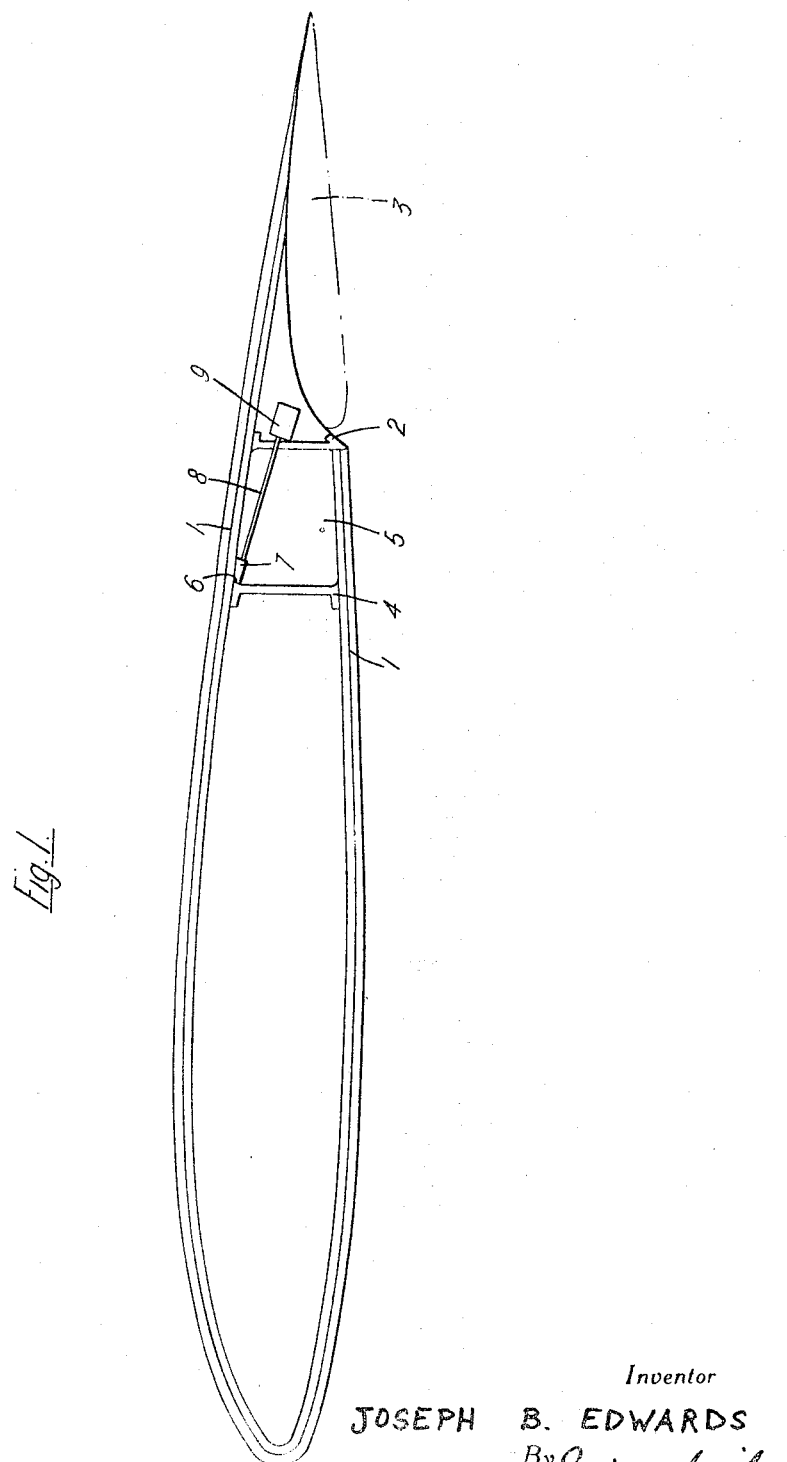

March 14, 1967  J. B. EDWARDS  3,309,042
AIRCRAFT AERODYNAMIC STRUCTURES
Filed Oct. 15, 1965  3 Sheets-Sheet 1

Inventor
JOSEPH B. EDWARDS
By
Attorneys

March 14, 1967  J. B. EDWARDS  3,309,042
AIRCRAFT AERODYNAMIC STRUCTURES
Filed Oct. 15, 1965  3 Sheets-Sheet 3

Inventor
JOSEPH B. EDWARDS
By Imirie & Smiley
Attorneys

United States Patent Office 3,309,042
Patented Mar. 14, 1967

3,309,042
AIRCRAFT AERODYNAMIC STRUCTURES
Joseph Brien Edwards, London, England, assignor to Hanley Page Limited, London, England, a corporation of Great Britain
Filed Oct. 15, 1965, Ser. No. 496,390
Claims priority, application Great Britain, Oct. 20, 1964, 42,806/64
8 Claims. (Cl. 244—42)

This invention relates to aircraft aerodynamic structures such as aerofoils but it can also be used for fuselages, tails and control surfaces such as ailerons, elevators and flaps and is used in making such structures having suction areas therein for laminar flow control of the air flowing thereon.

In known aerodynamic structures employing control of the laminar boundary layer flowing over the exterior surface thereof, the suction areas in the exterior surface of the structure are formed of panels consisting of a structural skin containing a series of chambers each covered by a porous element. The porous element may be in the form of a narrow slit or a narrow strip of foraminous material or small holes placed equidistant along a spanwise line of holes. Each porous element has suction applied thereto through a chamber in the wall in register with the porous elements. Suction is applied to the chambers through a series of throttling holes which communicate with a collector underneath. Thus the slits or porous elements do not penetrate right through the wall but break through the chambers into continuous ducts, so that air is collected by suction through the porous elements, chambers and ducts into a main duct or ducts connected to a source of suction within the structure.

In known wing structures employing this principle of laminar flow control the main duct or ducts extend through the wing to a source of suction within the aircraft. The ducts communicating with the chambers and the source of suction can either be separate to each chamber or can be connected to a series of chambers but in either event their cross sectional area increases towards the source of suction in proportion to the accumulated flow and therefore in some relation to the total number of porous elements communicating therewith.

The wing structure is made up of a framework having spanwise and chordwise webs and the suction ducts and/or the main ducts may be formed in these webs. The hollow wing interior forms storage space, usually the fuel tanks of the aircraft and therefore it is essential to minimise any reduction in the volume of the wing interior by the ducting systems employed.

It is known that laminar flow control is particularly suitable at high altitudes, e.g. 10,000 feet or higher, and that at different heights or altitudes more or less suction may be required at different outer surface areas of the structure so that it is desirable to be able to adjust the amount of suction applied to different surface areas. This amount once set for a given altitude range of, for example, 10,000 to 15,000 feet, within which the aircraft is designed primarily to fly does not require adjustment in flight but it is desirable to be able to make such adjustments during the construction of the wing structure as the periodical tests are made and the aerodynamics of the aircraft are assessed. It may, however, be desirable to be able to make periodical adjustments when the aircraft is grounded for routine checks between flights.

Once the craft has been built without any means for such adjustment, it is costly to make adjustments and with conventional boundary layer control structures it may be impossible. Moreover it is not suitable to effect the adjustment by blanking off or throttling some of the porous elements in the exterior surface of the structure as this gives rise to disturbances which can defeat the stabilising influence and lead to breakdown of laminar flow. With porous elements in the form of spanwise slits any interference with the continuity of the slits gives rise to the formation of vortices in the laminar flow and these vortices reduce the effectiveness of the control of laminar flow in the boundary layer.

The main object of the present invention is to provide an outer wall for an aircraft aerodynamic structure for use with laminar flow control of the boundary layer over the outer surface thereof in flight, in which the aforesaid disadvantages are minimised and control is provided for the amount of suction applied at different areas over the outer surface of the structure.

According to the present invention an outer wall for an aircraft aerodynamic structure comprises an outer skin having porous elements therein disposed in spanwise lines, a series of spanwise chambers disposed in wall elements beneath the skin and each in register on the inner face of the skin with at least one porous line and each chamber communicates with spanwise ducts within the wall, said ducts being divided into elongated compartments by transverse suction-tight elements, a plurality of chordwise ducts communicating through a plurality of passages with the spanwise ducts, and means for controlling the flow through the chordwise ducts, each of said chordwise ducts having its end disposed for connection to a main duct or ducts leading to a source of suction within the aircraft, the arrangement being such that when suction is applied to the chordwise ducts through the main duct or ducts said control means for the chordwise ducts can be adjusted to provide the required sub-pressure in the compartments and thereby to vary the suction applied through the porous elements to each of the outer areas of the outer skin above the different compartments.

In a preferred construction a skin is provided to mask the inner side of the chambers having apertures therein leading to the spanwise ducts secured to the opposite face of the inner skin.

The inner faces of the spanwise ducts are secured to an intermediate skin to the other face of which the chordwise ducts are secured, the opposite faces of the chordwise ducts forming the inner face of the wall and apertures are provided through the intermediate skin between the spanwise and chordwise ducts.

Preferably each of the spanwise ducts communicates through a plurality of passages in one longitudinal side thereof to a contiguous channel communicating through the said passages in the intermediate skin with the chordwise ducts.

In one preferred construction the spanwise and/or chordwise ducts are formed of corrugated elements, the apices of the alternate corrugations being secured to the aforesaid skins; alternatively the ducts could be formed by plate-like elements having flanges by which they are secured to the bounding skins on either edge thereof or their edges could be welded to the skins.

The wall is made as a unit in panels and when the aircraft structure i.e. its framework of webs and spars has been completed the panels can be secured to the webs and spars to complete the outer surface of the structure.

Preferably each chordwise duct is connected to one or a few compartments in a localised area of the wall and each chordwise duct at its end adjacent the main duct connection is provided with means for controlling the volume of flow. The said means are preferably disposed in front of the rear spanwise web so as to be accessible through said web from outside the structure for adjustment. The volume flow control means preferably comprise valves which may be adjustable individually or in groups.

The invention also applies to an aerodynamic structure such as an aircraft wing incorporating the said outer wall with its chordwise ducts engaged in a suction-tight manner with apertures in the main duct in which the volume flow control means are located. The main duct is preferably formed of lightweight material such as fibreglass or synthetic plastics preferably reinforced and is shaped to be disposed between the two rearward webs of the wing e.g. as a liner, so as to be in contact therewith and thus be free of the stresses within the wing structure.

The tunnel, formed by the two rearward webs together with the top and bottom walls, is preferably sealed and sustains the inward pressure loads occasioned by the low pressure in the main duct so that the liner does not have to be capable of withstanding inward pressure loads.

Figure 2:
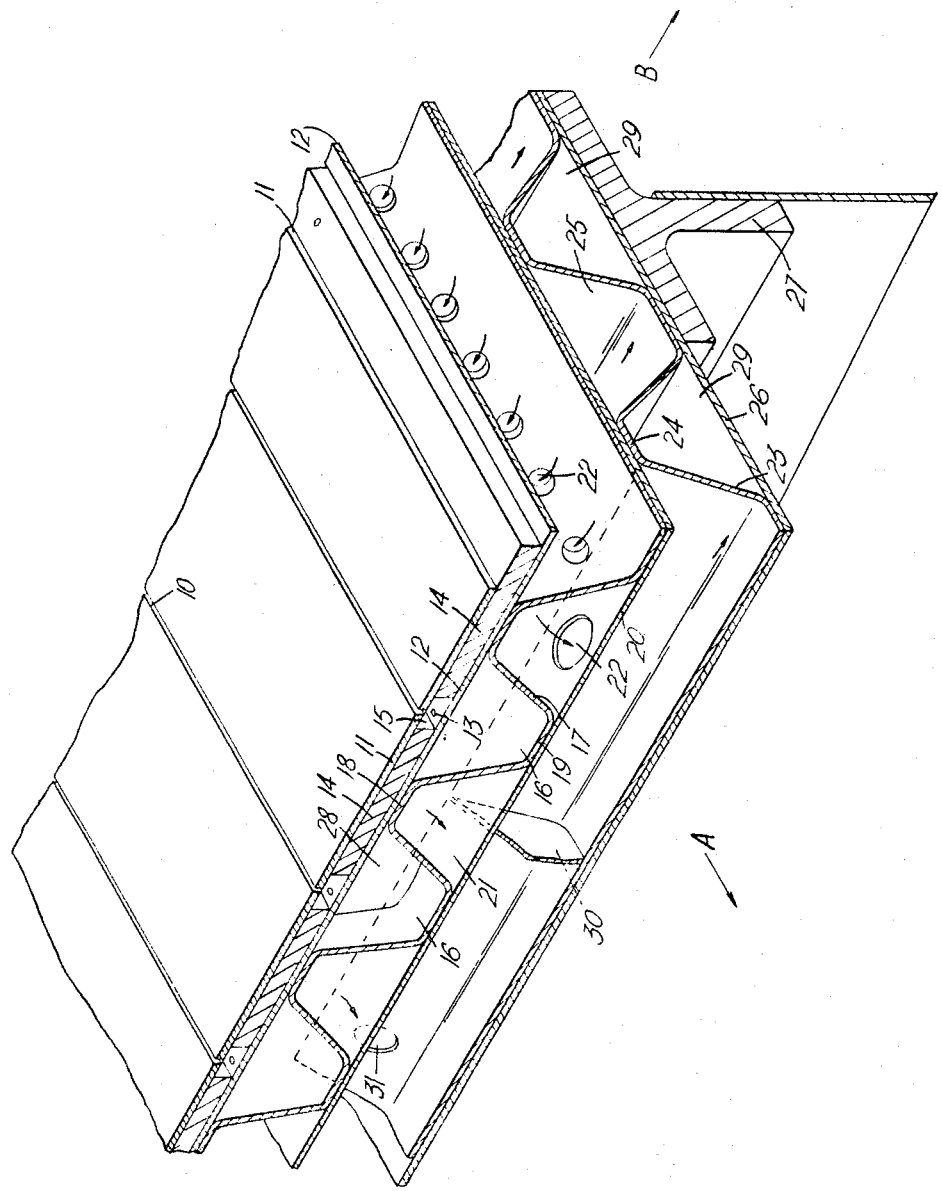
Figure 3:
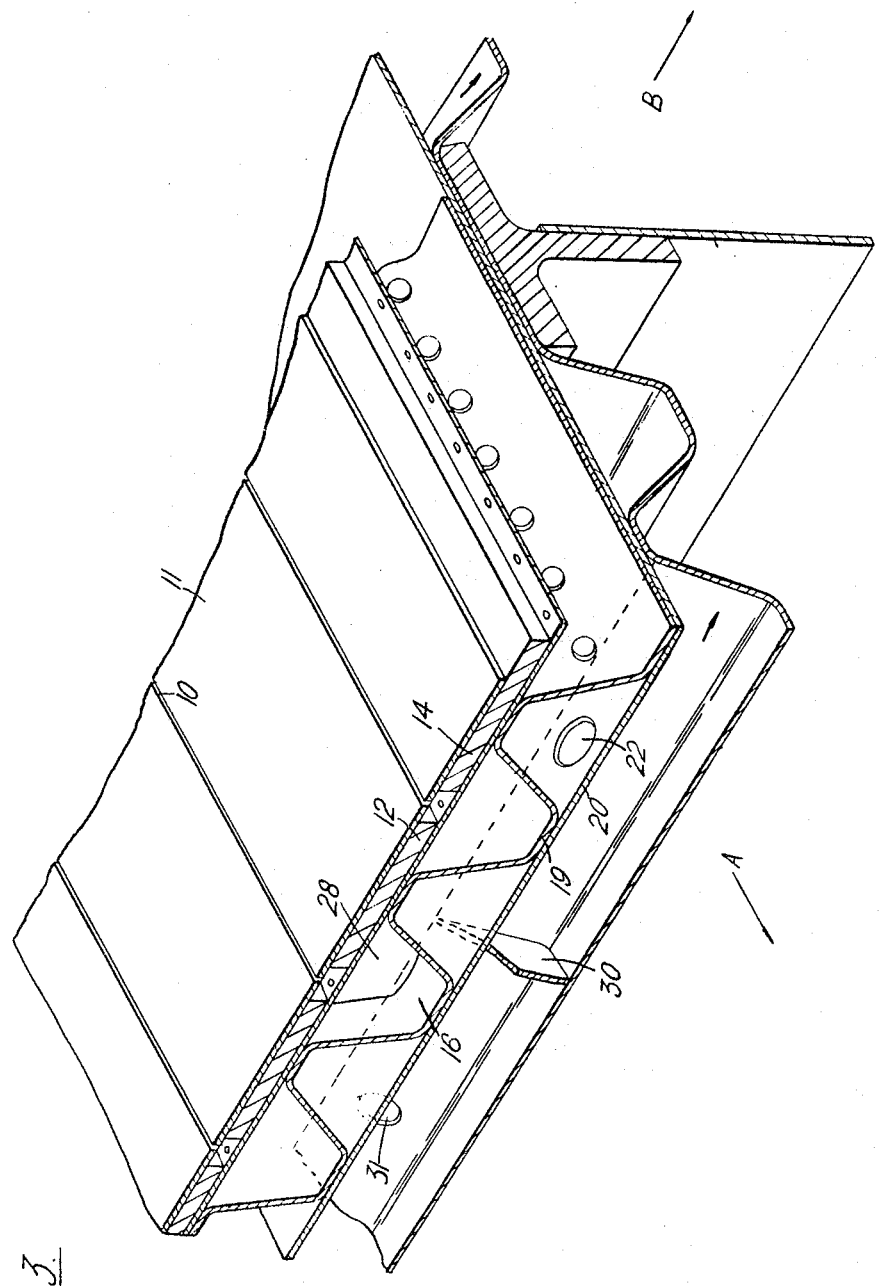

In order that the invention may be more fully understood some embodiments in accordance therewith will now be described by way of example with reference to the accompanying drawings in which:

FIG. 1 shows diagrammatically the cross section of an aircraft wing complete with an aileron or flap and the rear two spanwise webs, the remaining interior structure of the wing being omitted;

FIG. 2 discloses a perspective view partly in cross section of a panel forming the part of the outer wall of the wing; and, FIG. 3 is a view similar to FIG. 2 showing an alternative panel construction.

In the drawings the same references have been used to designate the same parts and in FIGS. 2 and 3 the arrows A and B indicate respectively the spanwise and chordwise direction of the aircraft wing as it will be when the finished craft is in flight. In FIG. 1 the outer wall of the wing is shown as of two layers and this is meant to represent the full thickness of the panel as shown in FIG. 2 or FIG. 3 in detail. The interior structure of the wing has the conventional chordwise webs (not shown) and spanwise webs of which the rear web 2 adjacent the flap 3 and the next forward web 4 are shown. Between these webs is mounted a main duct 5 which may be connected through the root of the wing to a source of suction of conventional design and forming no part of the present invention: these webs with the top and bottom walls of the wing forms a tunnel and the main duct 5 is formed as a liner thereto.

The duct 5 is made of a semi-rigid material such as fibre glass or a synthetic plastic material which may be reinforced but as shown is not necessarily material which forms part of the structure of the wing so that it does not have to take any of the normal stresses in the frame of the wing. The duct 5 is, however, preferably, as shown in FIG. 1, of a size to fit snugly as a liner between the upper and lower outer walls 1 and the webs 2 and 4. The duct 5 is provided with apertures at 6 through which the suction will be applied to the interior of the wall as will be described and these apertures are controlled by valves 7 actuated through rods 8 to devices 9 which are readily accessible from the outside of the wing when the aircraft is being checked by the ground staff between flights.

Turning to FIG. 2 this shows a section of a panel of the upper outer wall 1 and is provided with porous elements 10 in the form of elongated narrow slits, e.g. of 0.005 inch width, in an outer skin 11; these porous elements may, however, be formed by strips of foraminous material or by lines of perforations of the same diameter as the width of the slits. The porous elements are thus in the form of spanwise lines. Beneath the skin 11 is a sheet-like element 12 having rows of small apertures 13 therein beneath the slits 10; the skin 11 and the sheet 12 are separated by separating elements 14 cut short of the slits 10 to form chambers 15 running spanwise of the wing in register with the underside of the slits 10.

To the sheet 12 are connected a series of spanwise ducts 16 which are shown in FIG. 2 as formed within a corrugated sheet 17 the upper apices 18 of which are secured to the sheet 12 thereby forming the ducts 16 in communication through the holes 13 and the chambers 15 with the suction slits 10. The corrugated sheet 17 is, by its lower apices 19, secured to an intermediate sheet 20 which closes the open corrugations on the lower side to form ducts 21 parallel to the ducts 16. The sheet 20 is provided with apertures 22 which may for example be three quarters of an inch in diameter. One wall of each of the ducts 16 is provided with apertures 22, e.g. one eighth inch in diameter, therethrough thus providing communication from the slits 10 through to the underside of the sheet 20.

To the underside of the sheet 20 is secured a second corrugated member 23 secured by its upper apices 24 to the sheet 20 thereby forming ducts 25 into which the apertures 22 open, the ducts 25 being arranged chordwise of the structure. The underside of the corrugations in the member 23 is preferably closed by a plate-like member 26 to form ducts 29 between the ducts 25 and air tight partitions 30, similar to the partitions 28 to be described, may be provided in the ducts 29. If the partitions 30 are used then apertures such as shown at 31 would be provided between the ducts 25 and 29, preferably on one side only of the ducts 29.

The chordwise ducts 25 at their rear ends are provided with conventional means for securing them in suction-tight relationship with the apertures 6 (FIG. 1). The sheet 26 is shown as being secured to a chordwise frame element 27 of the wing structure.

As seen in FIG. 2 the ducts 16 are provided with transverse partitions 28 which, during the construction of the wall, are secured in an airtight manner within the ducts thus dividing the ducts lengthwise into a plurality of compartments each of which communicates with a predetermined length of one of the slits 10. The length of the compartments may vary over the whole spanwise length of the wing. It has been found that the length of the compartments should be smaller where the spanwise rate of variation of pressure on the exterior of the wing wall is greater, e.g. near the tip and root of the wing; since each duct 25 is intended to communicate through the hole 22 with one compartment of a spanwise duct it will be seen that by varying the length of the compartments by suitable positioning of the partitions 28, the desired distribution of compartment length can be achieved. It is, therefore, desirable that the length of compartment may vary over the length of the wing as at the root and tip for example or adjacent engine nacelles in the length of the wing. Similarly the provision of the partitions 30 and apertures 31, where employed, will increase the control of the suction over the wing area.

While in FIG. 1 a single duct 5 has been shown as the main duct, this could, of course, be a number of ducts; the duct 5, if it is a single duct, will preferably vary in cross section from its smallest cross section at or near the end remote from the suction source, e.g. the tip of the wing to its largest cross section at or near the suction source so that the cross section increases with the number of compartments from which it is sucking air thereby keeping the overall sub-pressure within the wall structure close to the desired value at that part of the structure. On the other hand over the length spanwise of the wing several of the ducts 25 may be connected in groups to different ducts 5 which will increase in cross section towards the suction source and all of which may be located side by side or one above the other, or side by side and one over the other in the manner shown for the single duct 5 in FIG. 1.

Although the ducts 16, 21 and 25, 29 are shown in FIG. 2 as being formed by corrugated members, it will be understood that any conventional construction can be employed such as, for example, vertical sheet members, or may be inclined, which are either provided with flanges secured as by welding to the sheets 12 and 20 or they may be plane sheets with their upper and lower edges welded directly to the sheets 12 and 20.

The valves 6 have been shown in FIG. 1 as operated by rods from the device 9 but it might be desirable to control more than one of the valves at the same time, for example three or four valves which control the compartments beneath an area in the wing span where adjustment of the boundary layer flow is found to be desirable during the construction of the wing. For this purpose the valves could be spring loaded flap valves in apertures in the wall of the ducts 25 or in an end wall closing the ducts 25 or some of them and connected to a series of eccentric cams mounted on a shaft which on rotation from outside the craft could cause the desired degree of opening of the group of valves against the closing action of their springs.

Referring to FIG. 3 this shows a panel construction somewhat similar to FIG. 2 having the outer skin 11 with the slits 10, the separators 14 and the plate 12 as well as the compartmented channels 16 forming the spanwise ducts. The sheet 20 is again provided and has its holes 22, but the chordwise ducts are not closed by the lower sheet 26 indicated in FIG. 2. Again the corrugated member 19 could be formed by the alternative means described with reference to FIG. 2. It will be understood that the aforesaid panel construction which is of a sandwich nature would be very stiff and would be suitable, for example, for a monocoque wing construction with the minimum number of internal structural members.

By this this means specific details of construction can be worked out as the design of the wing itself is developed and its aerodynamics are deduced from the aerodynamic requirements of the craft and hence the amount and distribution over the wing of the suction required to provide effective boundary layer control for the flying conditions envisaged. Although without using the valves the panels may be employed for a specified height range for the aircraft during flight, the provision of the valves 7 does ensure that even minor variations of the laminar flow over the length of the wing can be adjusted during the final stages of construction of the wing and even further adjusted by ground staff after the aircraft has been in flight for a number of flying hours, and from time to time during the life of the aircraft.

The skin 11 with its slits 10 may be formed in the manner described in our co-pending application No. 470,180.

What is claimed is:

1. An aircraft aerodynamic structure outer wall comprising an outer skin, a series of porous elements disposed in spanwise lines in said outer skin, wall elements disposed beneath said outer skin, spanwise ducts in said wall, a series of spanwise chambers in said wall elements each in register on the inner face of said skin with at least one porous element and communicating with said ducts, transverse suction-tight elements dividing said ducts into elongated compartments, a plurality of chordwise ducts in said wall communicating with said spanwise ducts through a plurality of passages and means for controlling air flow through said chordwise ducts, each of said chordwise ducts having its end disposed for connection to at least one main duct leading to a source of suction within the aircraft, the arrangement being such that when suction is applied to the chordwise ducts through the main duct or ducts said control means for the chordwise ducts can be adjusted to provide the required sub-pressure in the compartments and thereby to vary the suction applied through the porous elements to each of the outer areas of the outer skin above the different compartments.

2. A wall according to claim 1 wherein an inner skin is provided to mask the inner side of said chambers, the opposite side of said inner skin being secured to said spanwise ducts, said skin having apertures leading to said spanwise ducts.

3. A wall according to claim 1 wherein the inner faces of the spanwise ducts are secured to an intermediate skin to the other face of which the chordwise ducts are secured, the opposite faces of the chordwise ducts forming the inner face of the wall and apertures are provided through the intermediate skin between the spanwise and chordwise ducts.

4. A wall according to claim 1 wherein each of the spanwise ducts communicates through a plurality of passages in one longitudinal side thereof to a contiguous channel communicating through the said passages in the intermediate skin with the chordwise ducts.

5. A wall according to claim 1 wherein at least one of the sets of spanwise and chordwise ducts are formed of corrugated elements, the apices of alternate corrugations being secured to the outer and inner skins of said wall.

6. A wall according to claim 1 formed as a unit made up of panels shaped to be secured to the structure frame to complete the contour of the outer surface of said structure.

7. A wall according to claim 1 wherein each chordwise duct is connected to at least one compartment in a localised area of the wall and each chordwise duct at its end adjacent the main duct connection is provided with means for controlling the volume of flow.

8. An aircraft comprising a fuselage, wings, a tail structure, at least one prime mover, a source of suction within the aircraft, at least part of some of said fuselage and wings having outer walls comprising an outer skin, a series of porous elements disposed in spanwise lines in said outer skin, wall elements disposed beneath said outer skin, spanwise ducts in said wall, a series of spanwise chambers in said wall elements each in register on the inner face of said skin with at least one porous element and communicating with said ducts, transverse suction-tight elements dividing said ducts into elongated compartments, a plurality of chordwise ducts in said wall communicating with said spanwise ducts through a plurality of passages and means for controlling air flow through said chordwise ducts, each of said chordwise ducts having its end disposed for connection to at least one main duct leading to said source of suction, the arrangement being such that when suction is applied to the chordwise ducts through the main duct or ducts said control means for the chordwise ducts can be adjusted to provide the required sub-pressure in the compartments and thereby to vary the suction applied through the porous elements to each of the outer areas of the outer skin above the different compartments.

No references cited.

MILTON BUCHLER, *Primary Examiner.*

B. BELKIN, *Assistant Examiner.*